(12) United States Patent
Pinto, IV et al.

(10) Patent No.: US 8,640,455 B2
(45) Date of Patent: Feb. 4, 2014

(54) CONTROLLING HEAT IN A SYSTEM USING SMART MATERIALS

(75) Inventors: Nicholas W Pinto, IV, Ferndale, MI (US); Paul W. Alexander, Ypsilanti, MI (US); Patrick B. Usoro, Troy, MI (US); Alan L. Browne, Grosse Pointe, MI (US); Nancy L. Johnson, Northville, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 13/162,470

(22) Filed: Jun. 16, 2011

(65) Prior Publication Data

US 2011/0296826 A1 Dec. 8, 2011

Related U.S. Application Data

(63) Continuation-in-part of application No. 12/792,120, filed on Jun. 2, 2010.

(51) Int. Cl.
*F01B 29/10* (2006.01)
*F02G 1/04* (2006.01)

(52) U.S. Cl.
USPC .......................................................... 60/527

(58) Field of Classification Search
USPC .................................................. 60/527–529
See application file for complete search history.

(56) References Cited

U.S. PATENT DOCUMENTS

| | | | | | |
|---|---|---|---|---|---|
| 3,942,486 | A | * | 3/1976 | Kirchner | 123/41.12 |
| 4,290,393 | A | * | 9/1981 | Hart et al. | 123/41.12 |
| 5,875,096 | A | * | 2/1999 | Gates | 361/704 |
| 6,128,188 | A | * | 10/2000 | Hanners | 361/694 |
| 6,213,060 | B1 | * | 4/2001 | Kuze | 123/41.1 |
| 6,848,524 | B2 | * | 2/2005 | Vaillancourt et al. | 180/68.1 |
| 7,189,158 | B2 | * | 3/2007 | Motszko et al. | 454/143 |
| 2002/0018337 | A1 | * | 2/2002 | Nakamura | 361/697 |
| 2003/0058619 | A1 | * | 3/2003 | Morris et al. | 361/700 |
| 2005/0116336 | A1 | * | 6/2005 | Chopra et al. | 257/720 |
| 2005/0269726 | A1 | * | 12/2005 | Matabayas, Jr. | 264/104 |
| 2006/0054309 | A1 | * | 3/2006 | Lee et al. | 165/109.1 |
| 2006/0095178 | A1 | * | 5/2006 | Guilfoyle et al. | 701/36 |
| 2007/0044952 | A1 | * | 3/2007 | Kuno et al. | 165/287 |
| 2007/0163769 | A9 | * | 7/2007 | Li et al. | 165/185 |
| 2007/0169928 | A1 | * | 7/2007 | Dayan et al. | 165/287 |
| 2007/0216194 | A1 | * | 9/2007 | Rober et al. | 296/180.1 |
| 2008/0099193 | A1 | * | 5/2008 | Aksamit et al. | 165/300 |
| 2008/0133090 | A1 | * | 6/2008 | Browne et al. | 701/49 |
| 2008/0187803 | A1 | * | 8/2008 | Menon et al. | 429/24 |
| 2009/0043288 | A1 | * | 2/2009 | Petrakis | 604/890.1 |
| 2009/0272935 | A1 | * | 11/2009 | Hata et al. | 252/70 |
| 2009/0301408 | A1 | * | 12/2009 | Mounetou et al. | 123/41.1 |

(Continued)

FOREIGN PATENT DOCUMENTS

| | | | | |
|---|---|---|---|---|
| JP | 58044755 | A | * | 3/1983 |
| JP | 03012998 | A | * | 1/1991 |

(Continued)

*Primary Examiner* — Thomas Denion
*Assistant Examiner* — Mickey France

(57) ABSTRACT

A cooling assembly adapted for use with an exothermic system, includes a manipulable cooling member and/or source, and an active material element operable to selectively interengage or further engage the member or source and the system through displacement or formation of a thermal link.

17 Claims, 5 Drawing Sheets

(56) References Cited

U.S. PATENT DOCUMENTS

| | | | |
|---|---|---|---|
| 2009/0321044 A1* | 12/2009 | Hernon et al. | 165/80.2 |
| 2010/0018686 A1* | 1/2010 | Bontemps et al. | 165/133 |
| 2010/0066785 A1* | 3/2010 | Yamada et al. | 347/18 |
| 2010/0089468 A1* | 4/2010 | Scott et al. | 137/468 |
| 2010/0236236 A1* | 9/2010 | Mankame et al. | 60/527 |
| 2010/0267205 A1* | 10/2010 | Ward et al. | 438/122 |

FOREIGN PATENT DOCUMENTS

| | | | |
|---|---|---|---|
| JP | 2006334847 A | * | 12/2006 |
| JP | 2009008024 A | * | 1/2009 |
| WO | WO 2007083064 A2 | * | 7/2007 |

\* cited by examiner

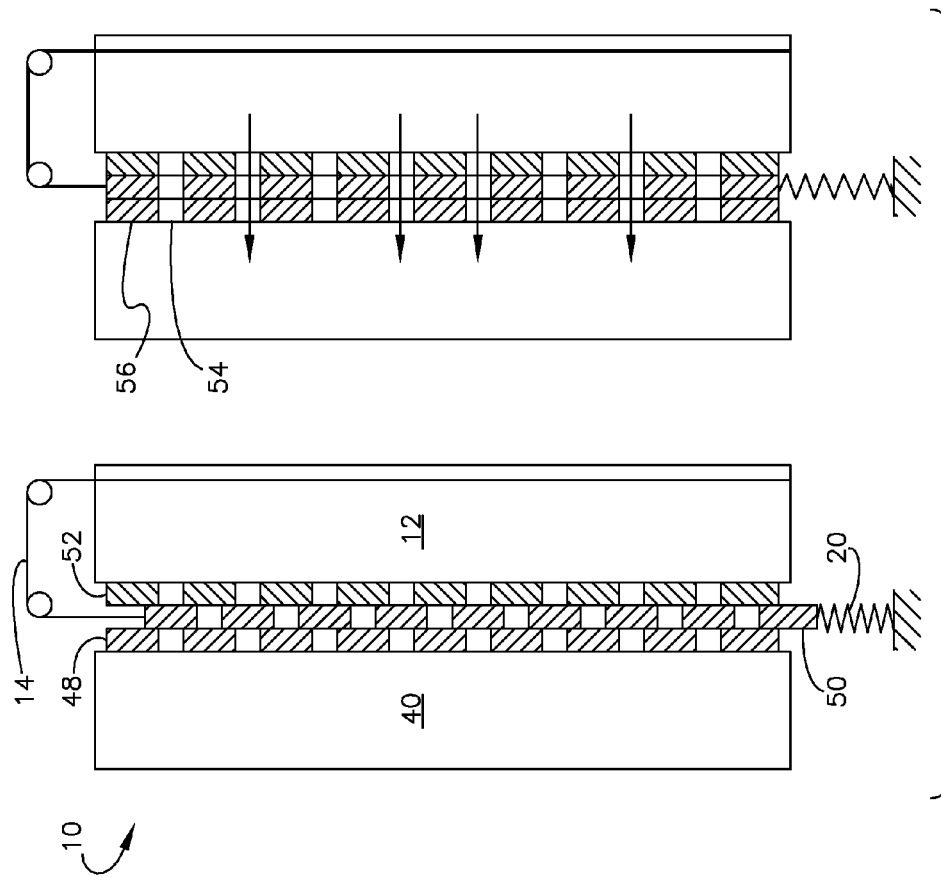
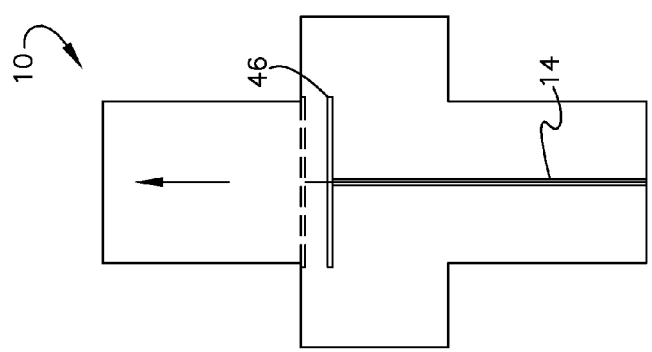
FIG. 7
FIG. 6

CONTROLLING HEAT IN A SYSTEM USING SMART MATERIALS

RELATED APPLICATIONS

This patent application claims priority to, and continues-in-part from U.S. patent application Ser. No. 12/792,120, entitled "ACCELERATING COOLING IN ACTIVE MATERIAL ACTUATORS USING HEAT SINKS", and filed Jun. 2, 2010, the disclosure of which is hereby incorporated by reference herein.

BACKGROUND OF THE INVENTION

1. Field of the Invention

The present disclosure generally relates to assemblies for and methods of accelerating cooling, and more particularly, to assemblies for and methods of accelerating cooling utilizing passively and actively actuated active materials.

2. Discussion of Prior Art

In exothermic systems, such as electronics, where continuous cooling of components is required, the use of a heat sink that is continuously in contact with the components has been found to be effective. However, in other applications, where certain components have to be heated and then cooled, or where it is not desirable to operate the system at low temperatures and the components require cooling only if a prescribed temperature is exceeded, the use of continuous cooling means is not desirable. It is appreciated, for example, that such continuously acting measures increase the amount of energy required to heat the components during the heating cycle, or delay the heating of the components to their most effective or efficient operating range.

As such, there remains a need in the art for an effective and robust means of deploying a cooling means when cooling is required and to retract or reduce the cooling means when cooling is not required or desired.

BRIEF SUMMARY OF THE INVENTION

The present invention addresses the afore-mentioned concerns by presenting such novel cooling means, and more particularly, a cooling assembly that utilizes active material actuation to autonomously accelerate the cooling of an exothermic system. The invention is useful, among other things, for offering autonomous temperature regulation without the need for an external control system, and in many instances, a smart solution that serves as both sensor and actuator, thereby reducing cost, mass, and packaging space. In further respect to the latter, the invention is further useful for reducing the likelihood of overheating during a thermal actuation cycle, which provides more efficient operation, and protects the integrity of the system.

The invention generally includes a cooling assembly adapted for use with an exothermic system presenting an ambient rate of cooling. The assembly includes a cooling member operable to accelerate the rate, so as to cool the system, when engaged or further engaged therewith, and an active material element external to the system. The active material element is operable to undergo a reversible change in fundamental property when exposed to or occluded from a thermal activation signal, and is communicatively coupled to the member. The assembly is configured such that the change causes the member and system to become engaged or further engaged.

This disclosure, including the use of active materials to drive a cooling member directly or to form a thermal link between a cooling source and the system, may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 6 is an elevation of a cooling assembly comprising a shiftable valve and shape memory wire drivenly coupled thereto, wherein the valve is shown in the closed condition in hidden-line type, in accordance with a preferred embodiment of the invention;

FIG. 7 presents elevations of a cooling assembly in the cooling and insulating conditions, and including a thermal barrier comprising plural shiftable layers, and a shape memory wire and return spring drivenly coupled to at least one layer, wherein each layer defines off-centered high and low selectively alignable thermally conductive sections, in accordance with a preferred embodiment of the invention;

DETAILED DESCRIPTION OF THE INVENTION

Figure 1A:
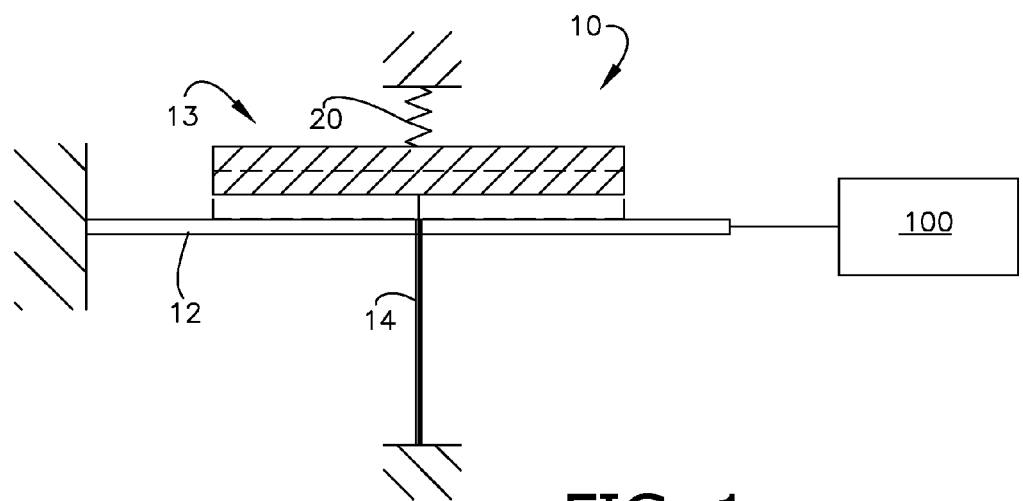
FIG. 1a is an elevation of a cooling assembly including a heat sink, and a shape memory wire and return spring drivenly coupled thereto (with the sink in the engaged position shown in hidden line type), in accordance with a preferred embodiment of the invention.

The present invention concerns a novel cooling assembly 10 adapted for use with an exothermic system 12 (i.e., a system that increases in temperature as it operates), such as a thermally activated active material actuator. The inventive assembly 10 provides means for autonomous temperature control of such systems 12 preferably using active materials to effectively manipulate a cooling member (e.g., heat sink, thermal barrier, turbulence generators, etc.) 13; manipulation may result in direct engagement and cooling, or may form a thermal link between a cooling source and the system 12. That is to say, where the system 12 presents a rate of cooling, the assembly 10 is configured to accelerate the rate through selective engagement. The assembly 10 generally features an external active material (e.g., shape memory alloy, dielectric polymer, piezoelectric composite, shape memory polymer, high-volume paraffin wax, etc.) element 14 in the form of an actuator, layer, etc., to effect selective engagement, with shape memory alloy being particularly suited for use. It is appreciated by those of ordinary skill in the art, however, that non-active material actuators may be used where limited to on-demand cooling.

The following more detailed description of preferred embodiments of the invention is merely exemplary in nature and is in no way intended to limit the invention, its application, or uses. It is appreciated that the benefits of the present invention may be employed over a wide range of applications, including with respect to electronic components (e.g., power transistors, microprocessors, computers, etc.), automobiles (e.g., automotive cooling systems, hydrogen fuel cell charging systems, hybrid batteries, etc.), telecommunications (e.g., cellular phones, facsimiles, cable lines, etc.), audio-visual equipment (e.g., VCR's, TV's, CD Players, Video Cameras, Video Game Players, etc.), avionic electronics (e.g., back up electronic driver systems, etc.), and aerospace systems (heating/cooling controls, battery charging, motor protection, etc.).

As used herein, shape memory alloys (SMA's) generally refer to a group of metallic materials that demonstrate the ability to return to some previously defined shape or size when subjected to an appropriate thermal stimulus. Shape memory alloys are capable of undergoing phase transformations in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transformation, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy achieves its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

In typical use, SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transformation temperature.

Figure 1B:
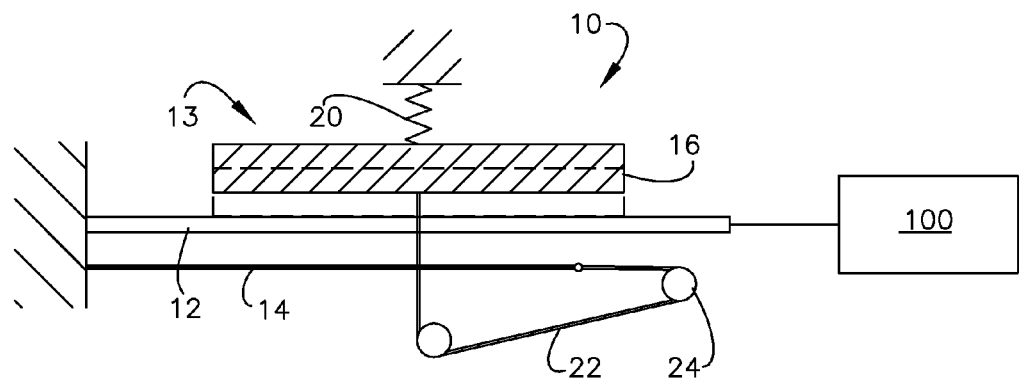
FIG. 1b is an elevation of a cooling assembly including a heat sink, shape memory wire and return spring drivenly coupled thereto, and further including a cable entrained by first and second pulleys (with the sink in the engaged position shown in hidden line type), in accordance with a preferred embodiment of the invention.
Figure 2:
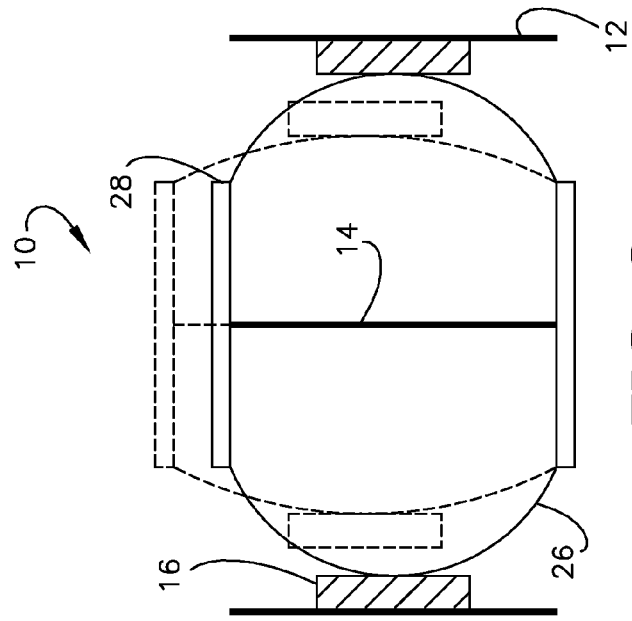
FIG. 2 is an elevation of a cooling assembly including first and second heat sinks engaging first and second systems or system components concurrently, a bowed structure, and a shape memory wire drivenly coupled thereto (with the sink in the engaged position shown in continuous line type), in accordance with a preferred embodiment of the invention.

Returning to the structural configuration of the cooling assembly 10, a first preferred embodiment of the invention is shown in FIGS. 1a-2, wherein the cooling member 13 includes a selectively engaged heat sink 16. The heat sink 16 is operable to directly increase the rate of cooling, and, more particularly, presents a greater thermal conductivity, when compared to the rate of thermal heat transfer due to convection between the system 12 and surrounding ambient space. More preferably, the heat sink 16 is operable to accelerate the rate of cooling by at least 25%, and most preferably by at least 100% in comparison to the otherwise ambient or non-heat sink engaged rate. That is to say, the sink material presents sufficient heat transfer properties, including a thermal conductivity and heat transfer coefficient substantially greater than the normal transfer rates of the ambient space, e.g., 0.024 W/mK (the conductivity of air). For example, the sink 16 may be formed of copper (e.g., copper alloys), or aluminum (e.g., aluminum alloys), which present thermal conductivities of approximately 400 and 250 W/mK, respectively. At least a portion of the surface of the sink 16 may be coated (for example with a low modulus high thermal conductivity material, low modulus enhancing intimate contact and thus high interfacial heat transfer coefficient), polished, scarified, or otherwise treated to promote heat transfer.

An active material element 14 suitable for use in this configuration is a shape memory actuator (FIGS. 1a,b), such as a shape memory alloy (SMA) wire. As used herein the term "wire" is non-limiting, and shall include other similar geometric configurations presenting tensile load strength/strain capabilities, such as cables, bundles, braids, ropes, strips, chains, and other elements to the extent compatible with the geometric limitations of the present invention. An exemplary system 12 particularly targeted in this embodiment is a thermally actuated active material actuator drivenly coupled to a load 100, as shown in FIGS. 1a,b. The system 12 is operable to perform useful mechanical work, as a result of contraction due to activation. For the sake of clarity, the term "cooling wire" will be henceforth used to describe the active material element 14 composing the assembly 10, where a thermally actuated active material actuator system 12 is engaged.

The cooling wire 14 is typically coupled to a source 18 (FIGS. 3-4) operable to deliver an activation signal thereto, but may be passively activated, e.g., by the system 12, as well. For example, where Joule heating is used to generate the thermal signal through the resistance of the wire 14, the source 18 may be an electric power supply 18, such as the charging system of a vehicle. It is appreciated that a controller (not shown) may be intermediately and communicatively coupled to the supply 18 and wire 14 and configured to control the actuation and/or timing of engagement between the member 13 and system 12.

As previously presented, a plurality of heat sink configurations may be utilized to efficiently engage the system 12; as such, the actual configuration of the sink 16 will not be restated herein. In FIG. 1a, it is noted, however, that the heat sink 16 is driven by an SMA wire 14 oriented orthogonally to the system 12 so as to effect normal engagement between the sink 16 and system 12. More preferably, the cooling wire 14 may be interconnected to the sink 16 via a cable 22 and at least one pulley 24 configured to redirect the force vector generated thereby. As a result the cooling wire 14 may be horizontally or otherwise oriented, as previously presented and shown in FIG. 1b, while still effecting an orthogonal connection, and therefore influence, upon the sink 16. To promote longevity, it is appreciated that the cable 22 is preferably more durable and robust, so as to be able to withstand repeated frictional engagement with the pulley(s) 24, in comparison to the active material wire 14.

Lastly, in a preferred embodiment, a return mechanism (e.g., extension spring) 20 is drivenly couple to the sink 16 opposite the cooling wire 14 and configured to compel the return of the sink 16 when the cooling wire 14 cools and deactivates. Both the cooling wire 14 and return mechanism 20 are supported by appropriate fixed structure.

In the embodiment shown in FIG. 2, a drive mechanism comprising at least one, and more preferably, first and second bowed structures 26 are used to redirect the force vector applied to first and second sinks 16. The illustrated structures 26 and cooling wire 14 run generally parallel and are interconnected by end caps 28. As shown, the structures 26 are bowed outward towards the system 12, shown again as, but not necessarily limited to, thermally activated actuator wires. The structures 26 are flexible, and configured to flex from a default normal configuration, wherein they are disengaged from the system 12 (shown in hidden-line type in FIG. 2) to a more bowed configuration when the cooling wire 14 is activated (shown in continuous-line type in FIG. 2). The structures 26 and wire 14 are cooperatively configured such that in the more bowed configuration, the structures 26 tangentially contact the system 12 and then preferably continue to bow so as to increase the contact area of engagement and generally absorb any further actuating force imparted after contact. It is appreciated that the structures 26 produce an increasing bias towards the normal configuration as they are caused to further bow, that the biasing force functions to return the sink 16 to the normal configuration upon the deactivation of the wire 12, and that the biasing force produces pre-strain within the cooling wire 14 in the deactivated condition, which improves the reaction of the assembly 10 to subsequent activation.

Figure 3:
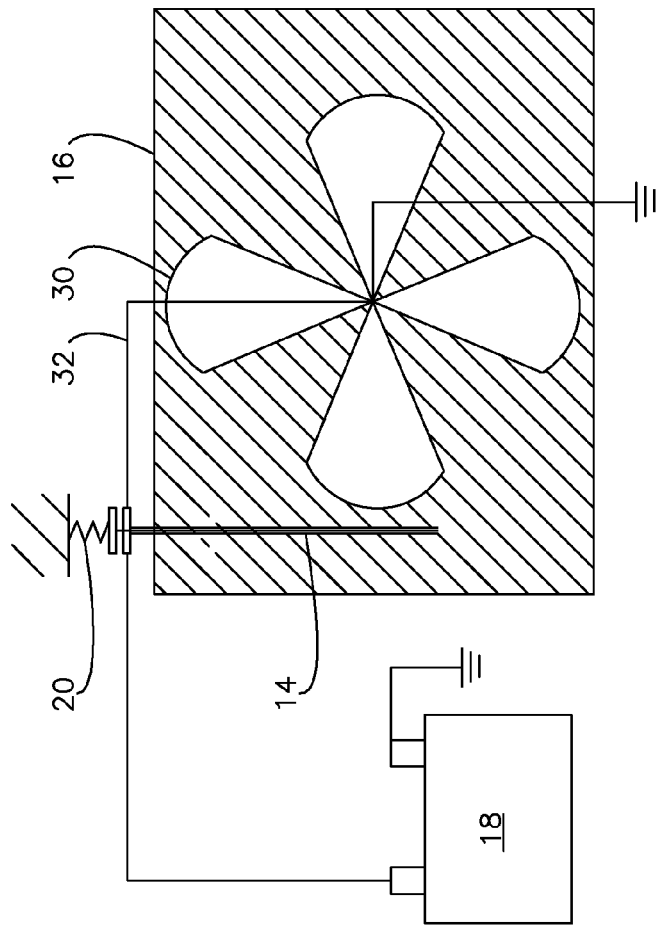
FIG. 3 is an elevation of a cooling assembly including a heat sink, fan, power source, switch intermediate and selectively coupling the power source and fan, and a shape memory wire drivenly coupled to the switch and imbedded within the sink, in accordance with a preferred embodiment of the invention.

More preferably, and as shown in FIG. 3, the cooling member 13 further includes a fan 30 fluidly coupled to the sink 16, so as to cause the sink 16 to be cooled and further cool the system 12. Here, the preferred cooling wire 14 is further configured to close a circuit 32 that energizes the fan 30, in addition to manipulating the sink 16. To that end, the cooling wire 14 may be imbedded within the sink 16, so as to be passively activated. Alternatively, a second cooling wire (not shown) may be dedicated to actuating the fan 30. It is well within the ambit of the invention to omit the sink 16 in this configuration, such that the fan 30 fluidly engages the system 12 directly, when energized.

Figure 4:
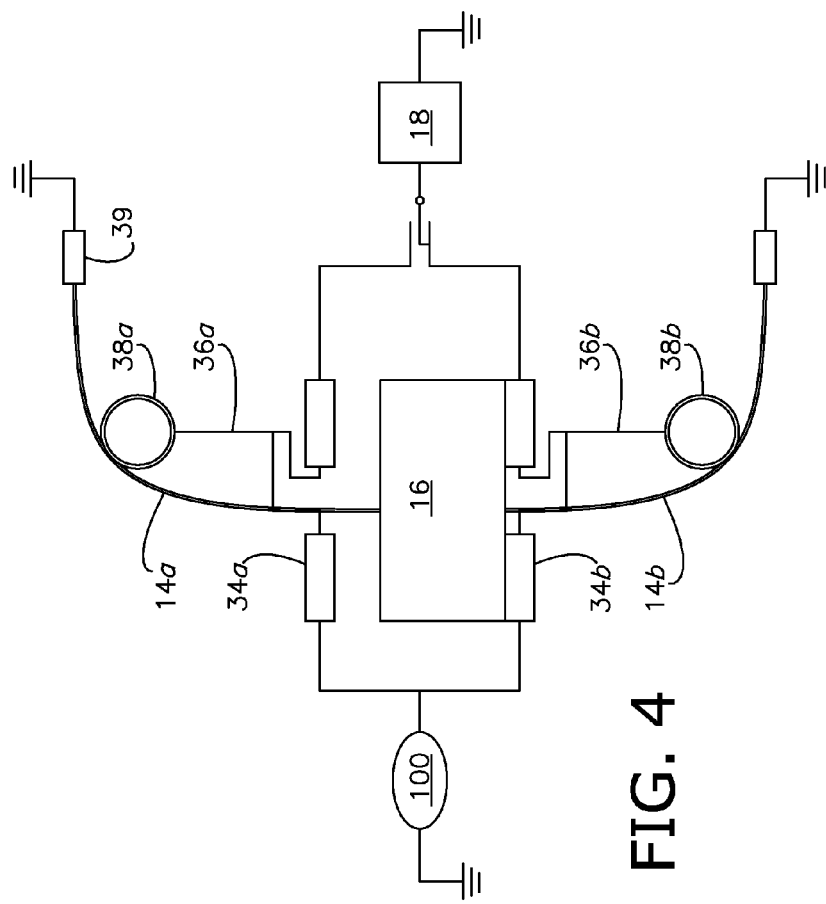
FIG. 4 is an elevation of a cooling assembly including a heat sink, power source, activating pulleys, and first and second shape memory wires drivenly coupled on opposite sides of the sink so as to alternatively cause the sink to engage the main and back up drivers of a dual system, in accordance with a preferred embodiment of the invention.

As shown in FIG. 4, it is appreciated that first and second active material elements (e.g., cooling wires) 14a,b may be drivenly coupled to a heat sink 16, and configured to shift or toggle (where antagonistic) the sink 16 between first and second achievable positions. For example, where the system 12 includes main and backup drivers 34a,b composing main and backup driver circuits 36a,b respectively, the first and second cooling wires 14a,b may be in contact with, e.g., via metallic pulleys 38a,b live in each circuit 36a,b, so as to be Joule heated when the main and backup driver circuits 36a,b are energized, respectively. When the first or second cooling wires 14a,b are activated, the sink 16 is caused to contact and therefore cool the main or backup drivers 34a,b, respectively. Opposite the sink 16, each of the cooling wires 14a,b is coupled to a bias resistor 39 presenting a resistive force greater than the heat sink load, but less than the wire actuation force, so that when the main drivers 34a are not used and the backups 34b are, the main cooling wire 14a is able to cool, while the back up cooling wire 14b heats to transformation. Thus, the assembly 10 is able to pull the heat sink 16 to the back up position before the cooling period of the main wire 14a has transpired. As such, a benefit of the invention is to use a single heat sink 16 for dual purposes (e.g., transmitter/receiver, motor driver/electronic brakes, etc.)

Figure 5:
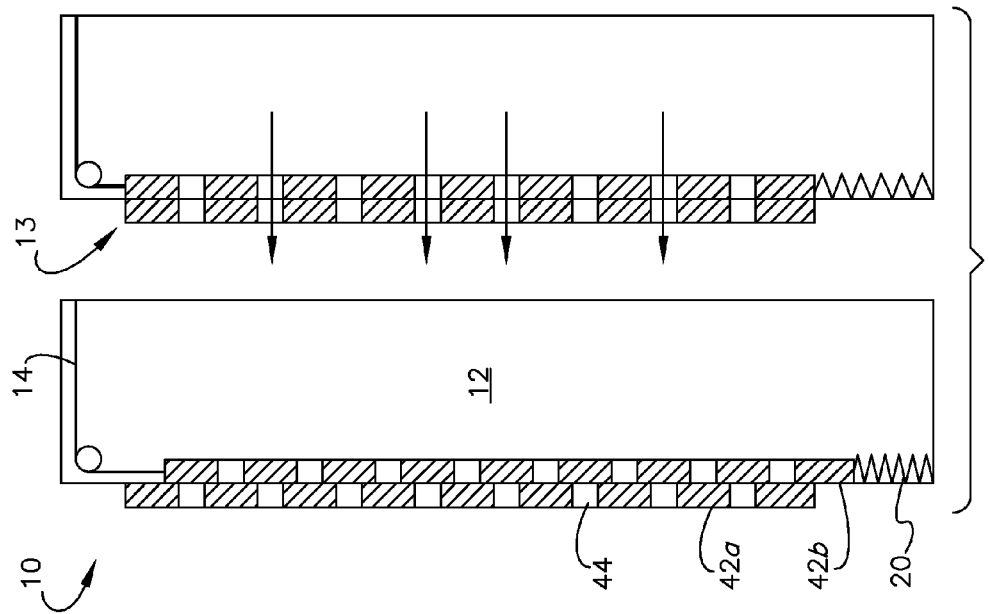
FIG. 5 presents elevations of a cooling assembly in cooling and closed conditions, and including a cooling member comprising shiftable panels, and a shape memory wire drivenly coupled to one of the panels, wherein each panel defines a plurality of selectively alignable apertures, in accordance with a preferred embodiment of the invention.

In another embodiment, activating the active material 14 causes the cooling member 13 and/or the material itself to form or increase a thermal link between a constant cooling source 40 and the system 12 (FIGS. 5-9). That is to say, the manipulated cooling member 13 may be the conduit to cooling rather than the cause of cooling directly. In a first example, where the cooling source 40 is the adjacent ambient space, the cooling member 13 includes first and second sliding panels 42a,b shiftable between first and second relative conditions and intermediate the system 12 and space (FIG. 5). Each of the panels 42a,b defines a plurality of apertures 44. The apertures 44 are aligned only in the second condition, so as to define through-holes. The through-holes fluidly interconnect the system 12 and space to enable convective cooling. Activating the material 14 in this configuration causes the panels 42a,b to shift to the second or "cooling" condition, shown with fluid flow arrows. Deactivating the material 14 enables the panels 42a,b to return to the first or "closed" condition through action of a return mechanism 20 (e.g., extension spring, etc.). With respect to the system 12, it is appreciated that a computer tower is particularly suited for use with this assembly 10, wherein the panels 42a,b compose a selectively vented sidewall of the tower operable to alternatively occlude the infiltration of dust, and enable cooling during use.

In another example, the cooling member 13 includes a valve 46 shiftable between at least open and closed conditions (FIG. 6). The active material 14 is drivenly coupled to the valve 46, and operable to physically manipulate the valve 46. As shown in FIG. 6, when the material 14 is activated, it may cause the valve 46 to shift to the open condition (shown in continuous line type in FIG. 6); however, it is appreciated that activation may be used to close a normally open valve; or release stored energy to accomplish either. It is appreciated that the illustrated assembly 10 is particularly suited for use with an engine system 12, and more particularly intermediate a radiator (not shown) and inlet from the engine. More specifically, the instant assembly 10 may be used as a thermostat housing, wherein the valve 46 is shut when the temperature of a fluid cooling source 40 (e.g., coolant) disposed therein is below a threshold temperature, and opened when the coolant surpasses the temperature. As such, the active material element 14 preferably runs along the trough of the conduit, so as to be in constant contact with the coolant. When the valve 46 is open, the cooling source 40 is able to enter the radiator, release heat energy at an accelerated rate, and return to the engine at a lower temperature. Where the active material is selected and its geometry configured such that the threshold temperature is equal to the coolant's temperature when hot, the active material may be passively activated. Further, it is appreciated that this configuration may be combined with the previously described fan actuation. That is to say, the same or an additional active material element 14 may be used to close a fan circuit 32, so that a fan 30 fluidly engages the radiator.

In another example, the cooling member 13 includes a shiftable thermal barrier comprising at least left, intermediate, and right adjacent layers 48,50,52 (FIG. 7). The barrier is disposed between a cooling source 40 (such as a heat sink, etc.) and the system 12 and contacts both, so as to promote conductive heat transfer. Each of the layers 48,50,52 further comprises a plurality of preferably offset high and low thermal conduction sections 54,56 in a normally staggered relative condition, wherein the high thermal conduction sections 54 are misaligned. The high thermal sections 54 may be formed of copper strips, and the low sections 56 may be formed of mineral wool, for example. Activation of the active material element (e.g., cooling wire) 14 causes at least one layer to shift, such that the high thermal sections 54 become generally aligned. In the illustrated embodiment, the cooling wire 14 is drivenly coupled to the middle or intermediate layer 50; and a return mechanism 20 is oppositely connected to the same. Where gradual or variable engagement is desired, the high thermal sections 54 may be made longer in their in-plane dimensions and one or more active material elements 14 may be configured to effect plural strokes that result in varying degrees of alignment. Finally, all moving interfaces are preferably lined with high thermal conductivity grease to ensure good thermal contact.

Figure 8:
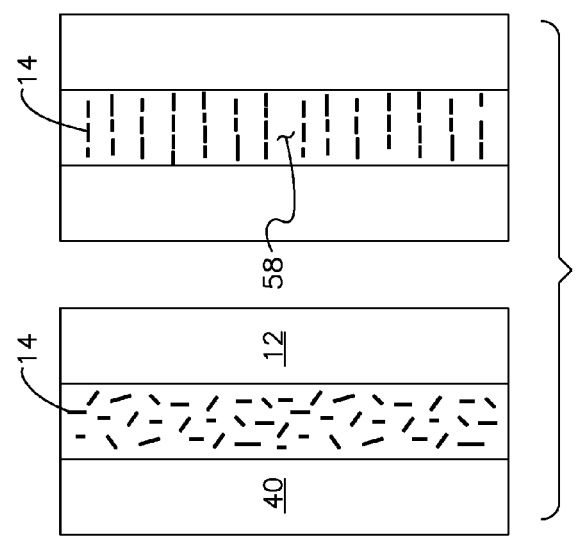
FIG. 8 presents elevations of a cooling assembly in cooling and insulating conditions, and including a layer of nanotubes selectively aligned so as to form a thermal link between an exothermic system and cooling source, wherein the nanotubes are misaligned, in accordance with a preferred embodiment of the invention.

In a similar example, the active material element 14 itself may form the thermal link upon activation. As shown in FIG. 8, for example, the active material element 14 comprises a plurality of nanotubes disposed in a flowable medium (e.g., thermally non-conductive gel) 58. Together the nanotubes 14 and medium 58 form a thermal barrier in the normal condition (FIG. 8), wherein the nanotubes 14 present random orientations. Activation, via a magnetic field, causes the nanotubes 14 to align and assemble lengthwise, so as to generally interconnect a cooling source 40 (e.g., heat sink) and the system 12 (FIG. 8). It is appreciated that the nanotubes 14 present a high thermal conductivity, which allows heat to more readily pass from the system 12 to the cooling source 40. To effect passive cooling, the magnetic circuit (not shown) may be energized by an SMA activated switch (also not shown) that responds to the system temperature, similarly to that shown in FIG. 3.

Figure 9:
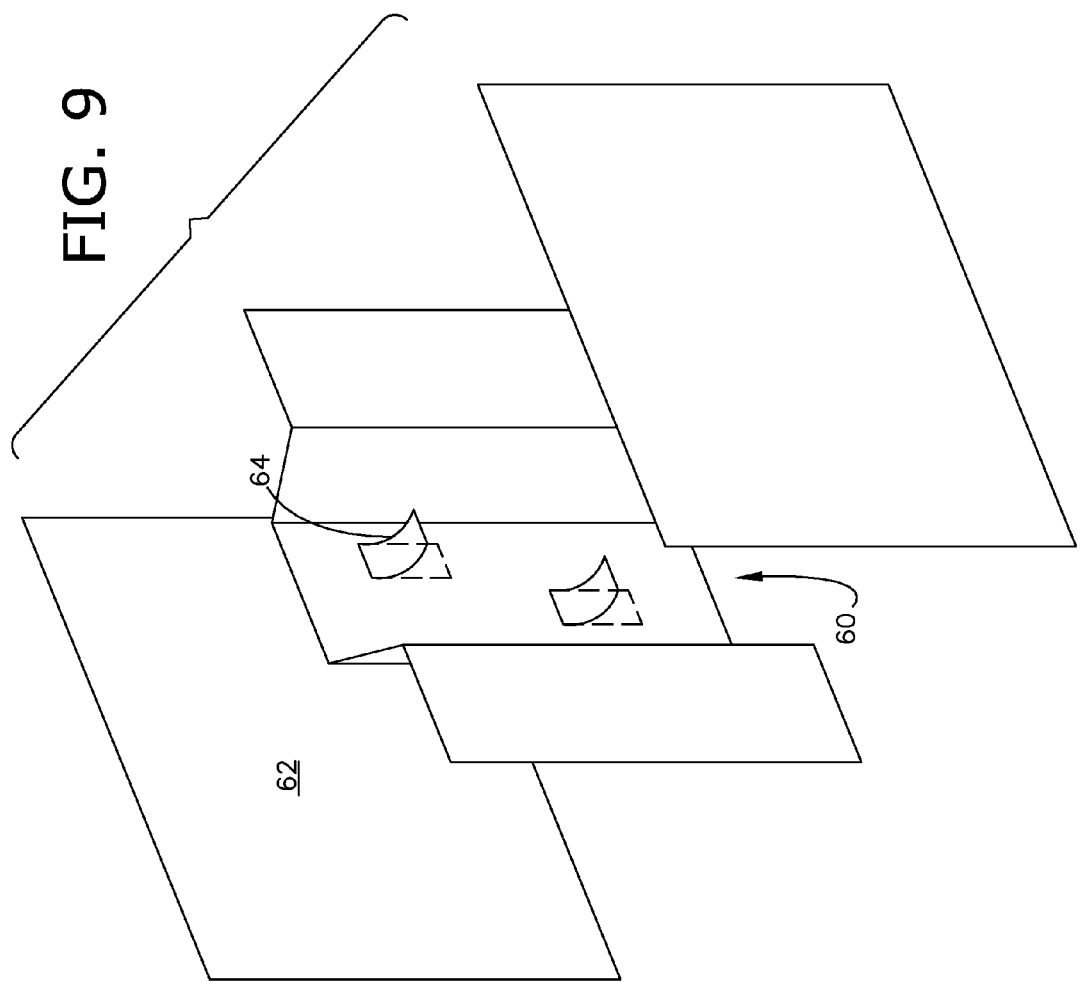
FIG. 9 is an exploded perspective view of a cooling system including cooling plate side walls defining a fluid flow channel, and further including reconfigurable turbulence generators disposed within the channel, in accordance with a preferred embodiment of the invention.

Lastly, it is appreciated that the cooling member 13 may be configured to further engage or increase the efficacy of the cooling source 40 already engaged with the system 12. In FIG. 9, for example, where this type of assembly 10 is adapted for thermal management of an EV battery cell, the cooling source 40 is a fluid flowing through flow channel(s) 60 defined thereby, and more particularly, by the cooling plate side walls 62 of the battery 12. It is appreciated that because the battery system 12 restricts the size of the channels 60, the flow is normally laminar. Passive SMA-based turbulence generators (or baffles) 64 are disposed within the channel 60, preferably in a staggered configuration (FIG. 9) and used to convert the laminar flow into turbulent flow, thus increasing the heat transfer rate by a factor of 2 to 5. More particularly, at least one reconfigurable baffle 64 shiftable between normal and obstructive conditions (shown in hidden and continuous line types in FIG. 9, respectively) are disposed so as to engage the flow upstream of the system 12. In the obstructive condition, the baffle 64 is raised from the surface and into the fluid 40, to promote mixing. It is appreciated, that this presents a self-regulating solution, wherein the flow disruption is proportional to the rise in temperature of the adjacent cooling plate 62 and thermal hysteresis in the SMA promotes stable operation.

Each baffle 64 comprises SMA and is trained to achieve the more obstructive condition, when activated. In a preferred embodiment, each turbulence generator or baffle 64 has a two layer construction, wherein the base is a thin elastic support layer that provides a bias/return force, and the top comprises a thin Martensitic SMA layer that provides the actuation force. The fabrication process ensures that the SMA layer has residual compressive stress in its normal or undeployed configuration. When the cooling wall 62 temperature rises above a threshold temperature, the SMA layer undergoes transformation that causes the cantilever to bend out of plane. When the cooling plate 62 temperature drops below a lower threshold temperature, the stress in the elastic layer causes the turbulence generator 64 to revert to its undeployed configuration. The SMA material composition, the thickness of the two layers and other aspects of the design and the process are tuned to the specific operating environment. Alternatives to having a cantilevered turbulence generator include fixed-fixed two-layer strips whose surface texture can be modified inducing wrinkling by controlling the temperature of the SMA layer; and finally, bi-metal strips that do not use SMAs may also be used in this application to a lesser efficiency.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A cooling assembly adapted for use with an exothermic system presenting an ambient rate of cooling, and for selectively accelerating the rate, said assembly comprising:
   a cooling member operable to accelerate the rate, so as to cool the system, when engaged or further engaged therewith; and
   a first active material element external to the system, and operable to undergo a reversible change in fundamental property when exposed to or occluded from an activation signal, and communicatively coupled to the member;
   said change being configured to selectively cause the member and system to be engaged or further engaged;
   wherein the member includes a heat sink, and the change causes the sink to autonomously engage or increase engagement with the system;
   wherein the element is drivenly coupled to the member, such that the change causes the member to translate;
   and wherein the member further includes a bowed structure, the change causes the structure to further bow, and the sink is caused to engage or increase engagement with the system by further bowing the structure.

2. The assembly as claimed in claim 1, wherein the element includes at least one shape memory alloy wire.

3. The assembly as claimed in claim 1, further comprising:
   at least one pulley; and
   a cable entrained by said at least one pulley, and interconnecting the element and sink.

4. The assembly as claimed in claim 1, wherein the member further includes a fan fluidly coupled to the sink, and the change is configured to activate the fan, so as to cause the sink to be cooled and further cool the system.

5. The assembly as claimed in claim 1, further comprising:
   a second active material operable to undergo a second change in fundamental property when exposed to or occluded from an activation signal, and drivenly coupled to the heat sink,
   wherein the first and second materials toggle the sink between first and second achievable positions.

6. A cooling assembly adapted for use with an exothermic system presenting an ambient rate of cooling, and for selectively accelerating the rate, said assembly comprising:
   a cooling member operable to accelerate the rate, so as to cool the system, when engaged or further engaged therewith; and
   a first active material element external to the system, and operable to undergo a reversible change in fundamental property when exposed to or occluded from an activation signal, and communicatively coupled to the member;
   said change being configured to selectively cause the member and system to be engaged or further engaged;
   wherein the member includes a heat sink, and the change causes the sink to autonomously engage or increase engagement with the system;
   wherein the element is drivenly coupled to the member, such that the change causes the member to translate;
   and wherein the assembly further comprises:
   a second active material operable to undergo a second change in fundamental property when exposed to or occluded from an activation signal, and drivenly coupled to the heat sink;
   wherein the first and second materials toggle the sink between first and second achievable positions;
   and wherein the system includes main and backup drivers composing main and backup driver circuits respectively, the first and second materials contact and are therefore Joule heated when the main and backup driver circuits are energized respectively, and the sink is configured to contact and therefore cool the main and backup drivers in the first and second positions, respectively.

7. The assembly as claimed in claim 1, wherein the change causes the member and/or element to form or increase a thermal link between a cooling source and the system.

8. The assembly as claimed in claim 7, wherein the cooling source is an ambient space, the member includes first and second sliding panels shiftable between first and second relative conditions and intermediate the system and space, the change causes the panels to shift to the second condition, each of the panels defines a plurality of apertures, the apertures are aligned, so as to define through-holes, only in the second condition, and the through-holes fluidly interconnect the system and space.

9. The assembly as claimed in claim 7, wherein the cooling source includes a radiator and a coolant flowable between the radiator and system, the cooling member includes a valve shiftable between open and closed conditions and intermediate the system and radiator, the change causes the valve to shift to the open condition, and the valve allows the coolant to flow to the radiator only when in the open condition.

10. The assembly as claimed in claim 9, wherein the member further includes a fan fluidly coupled to the radiator, and the change further causes the fan to activate.

11. A cooling assembly adapted for use with an exothermic system presenting an ambient rate of cooling, and for selectively accelerating the rate, said assembly comprising:
a cooling member operable to accelerate the rate, so as to cool the system, when engaged or further engaged therewith; and
a first active material element external to the system, and operable to undergo a reversible change in fundamental property when exposed to or occluded from an activation signal, and communicatively coupled to the member;
said change being configured to selectively cause the member and system to be engaged or further engaged;
wherein the change causes any of the member or the element to form or increase a thermal link between a cooling source and the system;
and wherein the member presents a shiftable thermal barrier comprising at least left, intermediate, and right adjacent layers and disposed between the source and system, each layer further comprises a plurality of offset high and low thermal conduction sections in a normally staggered relative condition, and the change is operable to shift at least one of the layers, so as to align the high thermal conduction sections in each layer.

12. The assembly as claimed in claim 11, wherein the high thermal conduction sections present a minimum thickness, and the active material element is operable to produce variable stroke lengths, and therefore variable degrees of alignment within the high thermal conduction sections in each layer, so as to present variable cooling.

13. A cooling assembly adapted for use with an exothermic system presenting an ambient rate of cooling, and for selectively accelerating the rate, said assembly comprising:
a cooling member operable to accelerate the rate, so as to cool the system, when engaged or further engaged therewith; and
a first active material element external to the system, and operable to undergo a reversible change in fundamental property when exposed to or occluded from an activation signal, and communicatively coupled to the member;
said change being configured to selectively cause the member and system to be engaged or further engaged;
wherein the change causes any of the member or the element to form or increase a thermal link between a cooling source and the system;
and wherein the element includes a plurality of nanotubes, and the change causes the nanotubes to generally align and interconnect the source and system, so as to allow heat to transfer therebetween.

14. The assembly as claimed in claim 13, wherein the cooling source is a normally laminar fluid flow engaging the system, the member includes at least one reconfigurable baffle shiftable between normal and obstructive conditions, said at least one baffle causes the flow to become turbulent in the obstructive condition, and the change causes said at least one baffle to shift to the obstructive condition.

15. The assembly as claimed in claim 1, wherein the element is thermally activated, and the system and element are cooperatively configured and relatively positioned, such that the system passively activates the element, when a predetermined temperature threshold is exceeded.

16. The assembly as claimed in claim 1, further comprising:
a return mechanism communicatively coupled to the member and operable to cause the member to disengage or reduce engagement with the system, when the change is reversed.

17. The assembly as claimed in claim 16, wherein the return mechanism includes a bias spring.

* * * * *